United States Patent
Crowley

(10) Patent No.: US 7,099,071 B2
(45) Date of Patent: Aug. 29, 2006

(54) METHOD OF MOVING A CARBON NANOTUBE

(75) Inventor: Robert Joseph Crowley, Sudbury, MA (US)

(73) Assignee: AMBIT Corporation, Manchester, MA (US)

( * ) Notice: Subject to any disclaimer, the term of this patent is extended or adjusted under 35 U.S.C. 154(b) by 279 days.

(21) Appl. No.: 10/789,390

(22) Filed: Feb. 27, 2004

(65) Prior Publication Data

US 2005/0063658 A1 Mar. 24, 2005

Related U.S. Application Data

(62) Division of application No. 10/646,945, filed on Aug. 22, 2003, which is a division of application No. 09/901,309, filed on Jul. 9, 2001, now Pat. No. 6,700,550, which is a division of application No. 09/523,626, filed on Mar. 13, 2000, now Pat. No. 6,258,401, which is a division of application No. 08/988,801, filed on Dec. 11, 1997, now Pat. No. 6,038,060.

(60) Provisional application No. 60/036,085, filed on Jan. 16, 1997.

(51) Int. Cl.
*B82B 3/00* (2006.01)
*G02F 1/37* (2006.01)

(52) U.S. Cl. .................. 359/328; 977/724; 977/742

(58) Field of Classification Search ........ 359/326–332; 977/724, 732, 742
See application file for complete search history.

(56) References Cited

U.S. PATENT DOCUMENTS

| 6,038,060 A | * | 3/2000 | Crowley | ............ 359/328 |
|---|---|---|---|---|
| 6,258,401 B1 | * | 7/2001 | Crowley | ............ 427/126.3 |
| 6,669,256 B1 | * | 12/2003 | Nakayama et al. | ............ 294/99.1 |
| 6,700,550 B1 | * | 3/2004 | Crowley | ............ 343/792.5 |
| 6,802,549 B1 | * | 10/2004 | Nakayama et al. | ............ 294/99.1 |
| 6,805,390 B1 | * | 10/2004 | Nakayama et al. | ............ 294/99.1 |

OTHER PUBLICATIONS

Poncharal et al, "Electrostatic Deflections and Electromechanical Resonances of Carbon Nanotubes", SCIENCE, vol. 283, Mar. 5, 1999, pp. 1513-1516.*

* cited by examiner

*Primary Examiner*—John D. Lee
(74) *Attorney, Agent, or Firm*—Don Halgren

(57) ABSTRACT

A method of moving a carbon nanotube which is attached by one end thereof, to a junction on a substrate. The method comprises applying a charge to the carbon nanotube, and providing a repelling force to an adjacent structure from the carbon nanotube to which the charge has been applied.

9 Claims, 4 Drawing Sheets

METHOD OF MOVING A CARBON NANOTUBE

CROSS-REFERENCE TO RELATED APPLICATION

This application is a DIV of Ser. No. 10/646,945, (filed Aug. 22, 2003), which is a DIV of Ser. No. 09/901,309, (filed Jul. 9, 2001), now U.S. Pat. No. 6,700,550, which is a DIV of Ser. No. 09/523,626 (filed Mar. 13, 2000), now U.S. Pat. No. 6,258,401, which is a DIV of Ser. No. 08/988,801 (filed Dec. 11, 1997), now U.S. Pat. No. 6,038,060, which claims benefit of Prov. Applic. 60/036,085 filed Jan. 16, 1997, all incorporated herein by reference.

TECHNICAL FIELD

This invention relates to small aligned conductors and junctions configured to efficiently admit, modify and emit electromagnetic radiation around light wavelengths.

BACKGROUND INFORMATION

Optical materials employing microstructures that exhibit the property of birefringence are commonly used to generate harmonic energy around light wavelengths. These materials are useful for frequency doubling, tripling or multiplying one or more fundamental inputs. Layered crystal structures are known to exhibit practical nonlinear transmission of light energy that usually result in harmonic generation with efficiencies that are generally low. Attempts have been made to optimize the harmonic generating efficiency of various materials by orienting molecules sandwiched between substrate materials. In U.S. Pat. No. 5,589,235, an applied magnetic field is used to pre-align molecules, and then a source of radiation is used to cross-link the molecules so that they maintain their position after the magnetic field is removed. In another attempt to fabricate a device that exhibits high harmonic generating efficiency, U.S. Pat. No. 5,380,410 describes a method by which periodic electrodes may be fabricated to provide inversion regions that improve the efficiency of a ferroelectric material which exhibits an intrinsic nonlinear optical property. The fabrication of a nonlinear optical region or layer on a material that generally has inherently linear characteristics is disclosed in U.S. Pat. No. 5,157,674 which teaches a process by which a charge transfer dopant is introduced to produce a semiconducting region on a bulk glass or microcrystalline substrate.

One apparent drawback to these approaches is wavelength-dependent attenuation. This attenuation occurs when lightwave energy propagates through lossy materials, resulting in attenuation. In general, both polymer and glass substrate materials exhibit high attenuation through absorption in the near UV and UV regions. Microcrystalline materials that utilize birefringence generally must have sufficient light path propagation length to produce sufficient phase changes for significant harmonic generation. Longer path lengths usually result in even greater attenuation.

Researchers have had to resort to modification of bulk materials or orientation of molecules in a solution or matrix to produce structures that exhibit optical nonlinearity, and usable harmonic generation. These researchers have not been able to successfully utilize practices that are now common in the electromagnetic radio electronics fields, even though light waves are merely electromagnetic waves of short wavelengths, primarily because techniques and materials for the fabrication of practical electromagnetically responsive elements in the small sizes necessary for efficient use at light wavelengths in the ranges of 10,000 nanometers and shorter are not available. Optical crystal materials and composite materials, due to their structure, make it difficult to optimize the orientation of individual electromagnetically responsive elements.

An important aspect of successful fabrication and use of radio frequency nonlinear harmonic generating materials is the ability to control the orientation and sizes of those elements with respect to various electromagnetic fields. This is possible since radio frequency waves, and even microwaves, are relatively long. Developers of nonlinear, harmonic-producing devices for radio wave applications have been able to successfully fabricate numerous circuits, cavities, transmission lines, junctions and other structures scaled to radio wavelengths. This practice has been extended over time lo include VHF, UHF, microwave and so-called millimeter wave regimes, and has included discrete components, transmission lines and antenna systems that have been scaled down to operate optimally at ever-higher frequencies.

Designers have also been able to fabricate nonlinear junctions that are small with respect to the wavelengths involved. These junctions are capable of rectification, mixing, detection and amplification over a portion of the full cycle of the alternating current, electromagnetic wave energy, and include conventional diodes, Shottky diodes, tunne diodes, transistors, field effect transistors, bipolar transistors including discrete components and mass array fabricated devices such as integrated circuits and linear and two-dimensional arrays.

It would be logical to extend this practice into infrared, lightwave and ultraviolet regimes if the materials, designs, and techniques needed to accomplish these developments could be understood and executed. Work toward this goal is proceeding today with limited success. It has been suggested that carbon nanotubes, also known as $C_{60}$ or fullerene structures, could be used as part of such electronic devices that would operate efficiently in the optical domain. Researchers have had limited success with films of $C_{60}$ that have appeared to have properties that are both electronic and optical, and initial attempts at producing components have been made using layered, deposited and more-or-less random length coatings of this and other polymeric conductive materials, but efficiencies, though improved, are still not optimized, and design criteria for practical devices are still not developed.

It would be desirable if junctions, elements and conductors could be fabricated that operate in the regime of light wavelengths in a way that made them efficient, repeatable and manufacturable. It would be desirable if these junctions, elements or conductors were configurable to provide efficient nonlinear transfer characteristics that could be used for generating harmonics, mixing, modulation, frequency multiplication, and amplification of lightwave signals in addition to more linear antenna-like properties such as resonance, charge storage and reradiation of electromagnetic field energy. Many useful applications would be found for the successful highly efficient nonlinear optical material, device or technique that could convert infrared energy to visible lightwave energy and to ultraviolet lightwave energy in an efficient manner. It would be particularly desirable if the devices could be produced quickly and inexpensively, and if their characteristics could be controlled effectively using known manufacturing process control techniques.

SUMMARY OF THE INVENTION

The invention features a light responsive electromagnetic conductor placed in electrical contact with a junction exhibiting polar, nonlinear electrical transfer characteristics. The invention allows conversion of radiant light frequency energy to a conducted electron charge transfer across a semiconducting junction, and subsequent conversion and reradiation of a portion of the energy to lightwave energy at a multiple of the light frequency. In one aspect, a method of generating harmonic energy near light wavelengths is described comprising the steps of exposing a conductor to an infrared, visible or ultraviolet electromagnetic light energy having an alternating waveform, inducing a current with electromagnetic energy in the conductor to cause an electrical charge to cross a junction, and emitting at least a portion of the energy at a harmonic multiple of the light energy.

In one aspect, the invention relates to the use of a substrate material to support carbon nanotubes which are used as frequency selective electrical conductors. In one embodiment, the conductors are polarized with respect to the substrate. In another embodiment, a foraminous substrate is used to influence and support the orientation of the electrical conductors. In another embodiment, the foraminous substrate supports a nanoparticle which creates at least a portion of a nonlinear electrical junction. In another aspect, the invention relates to a conductive element with a nonlinear charge transfer region that is small with respect to that element.

In one aspect, the invention relates to an antenna structure that admits and radiates at light wavelengths. In another aspect, a lightwave electromagnetic antenna having a linear conductor is attached to a substrate material, with the linear conductor having an electrical length sized to respond to an electromagnetic light wavelength. In another aspect, the invention relates to antennas with conducting elements of less than 2000 nanometers in length that operate near light wavelengths. In one embodiment, the conductors form a traveling wave structure. In another embodiment, the conductors are arranged to form a log periodic structure.

In another aspect, the invention relates to a conductive element with an electrical length about a multiple of ¼ wavelength of a light wavelength. In one embodiment, the electrical length of the conductor inclusive of a junction may be about 600 nanometers corresponding to ½ wavelength of infrared light. Impinging infrared light energy is collected, rectified and reradiated at a multiple of the infrared light frequency with high efficiency. In another embodiment, the electrical lengths of the conductor may be in a range from about 20 nanometers to about 2000 nanometers corresponding to ultraviolet, visible and infrared light. In one embodiment, the lengths of the conductors may be staggered to form a broadband structure. In one embodiment, the conductors are arranged in a generally parallel relationship.

In another aspect, the invention relates to an array of conductive elements with electrical lengths around a multiple of ¼ wavelength of light, arranged so that at least one optical port and at least one electrical port, are held in communication via a nonlinear junction. In one embodiment, the electrical port is a terminal on a optical device which modifies a charge transfer characteristic of a junction. In one embodiment, a device for rectifying an alternating waveform occurring around light wavelengths is comprised of a short conductor of less than 10,000 nanometers in length and a nonlinear region with an electrical length less than the light wavelength. In another embodiment, the nonlinear junction region consists of a nanoparticle. In another embodiment, the junction is a polarized, doped region with an electrical length shorter than ½ of the light wavelength.

In another aspect, the invention relates to the process by which the growth of lightwave antenna elements upon a substrate may be controlled by observation of an optical property. In one embodiment, various lengths of nanotubes are grown in a controlled manner upon the substrate.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. The drawings are not necessarily to scale, emphasis being placed upon illustrating the principles of the invention.

DESCRIPTION

Figure 1:
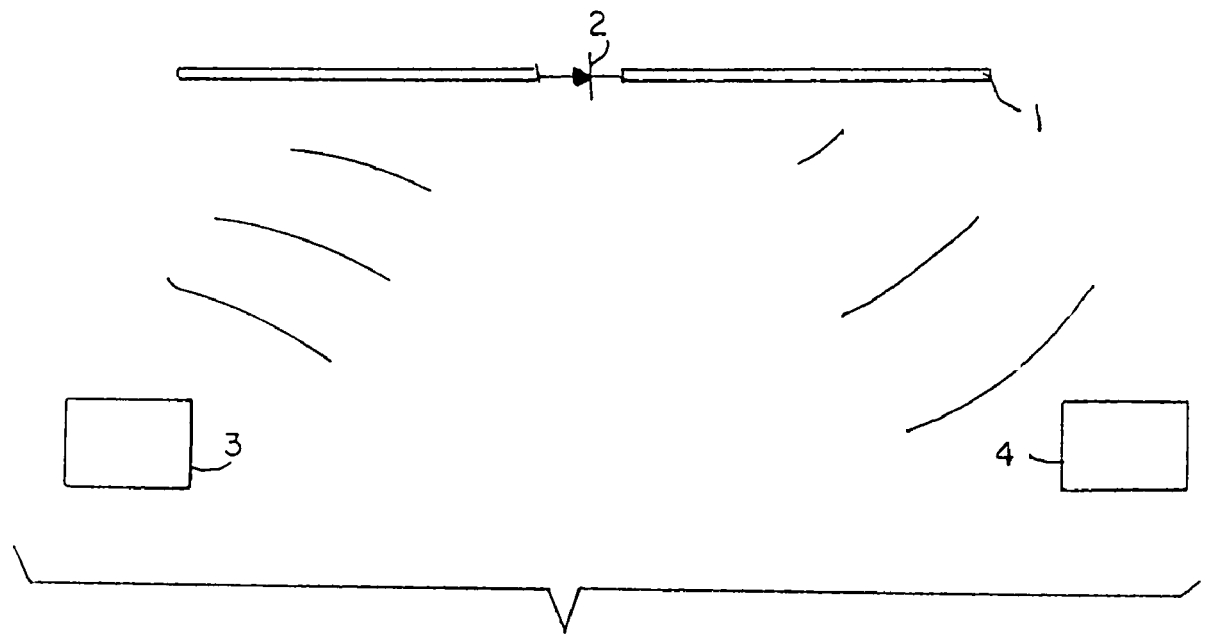
FIG. 1 is a side view of a prior art radio frequency dipole antenna with a center diode junction shown in relation to a signal generator and a signal receiver located in space around the antenna.

Referring to FIG. 1, a prior art radio frequency dipole antenna 1 is shown as it is used in many forms of radio communications and shown particularly in this case for illustrating one common use and technique for harmonic generation and reradiation. Such antennas ordinarily comprise two ¼ wave sections joined at or near the center and may include a nonlinear diode junction 2 connected therebetween. It is known that a ½ wave antenna has desirable properties that efficiently pick up and radiates radio frequency energy, and therefore the so-called dipole antenna is considered to be a basic building block in the antenna art. This desirable antenna property is generally known as resonance, and it should be understood that there are other lengths of conductors that exhibit resonant effects as a function of frequency and length. An alarm system for theft control purposes may be constructed with such an antenna and a transmitter 3 operating at frequency n, and a receiver 4, tuned to listen for signal(s) at frequency 2n. When transmitted signal n impinges upon the antenna 1, a changing electrical field induces a current which travels through the length of that antenna. Ordinarily that field would reverse in the case of linear operation (no diode) of the antenna elements, but in this case the presence of the nonlinear diode junction 2 partway through the element creates a conductance change part way through the conduction cycle which limits and distorts the ordinarily linear current flow and converts it into a nonlinear, non-sinusoidal waveform. Nonlinear waveforms contain harmonic energy and may be described by transform equations which are based on Fourier's Theory of Trigonometric Series which among other things show that all components of a given waveform are comprised of at least one or more sinusoidal waveforms that are mathematically related. Some of the harmonic energy is reradiated into space and may be picked up by nearby receiver 4, which may then sound an alarm. A typical transmitted signal may be 1000 MHz. In this case, the electrical length of the dipole antenna may be one-half of the wave length of 1000 MHz, which in free space is approximately 30 centimeters, resulting in a corresponding half-wave dipole structure of about 15 centimeters long.

Figure 1A:
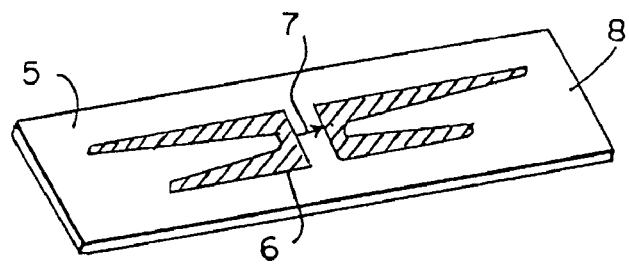
FIG. 1a is a perspective view of a prior art radio frequency theft control tag.

Referring now to FIG. 1A, a prior art radio frequency theft control tag of which tag 5 is comprised of a thin conductor 6 and a small diode 7 mounted within a flat plastic housing or substrate 8. The thin conductor 6 may be a foil shaped to form one or more dipole antenna lengths in parallel which may be harmonically related as a function of electrical length, therefore the dipole antenna 1 previously shown in FIG. 1 may be modified so that it reradiates even more efficiently at double the input frequency. A typical theft control tag system may operate at about 5000 MHz, which corresponds to a wavelength of about 6 centimeters and a corresponding half-wave dipole length of about 3 centimeters. Therefore a transmitter may be placed that emits at 5000 MHz, and a receiver may be placed that listens at 10,000 MHz, or twice the frequency. These frequencies are just one example of a phenomenon that is observable at all electromagnetic wavelengths but that has not been put to use in light wave regimes because materials could not be fabricated nor it been apparent that ordinary radio wave practices could be usefully applied in such a way to very short wavelengths such as those associated with light wavelengths.

Recently, large-scale synthesis of aligned carbon nanotubes has been demonstrated at the Chinese Academy of Sciences in Beijing by Li, et al. These structures can be grown on a substrate of foraminous silica and have lengths in the range of up to about 50 micrometers long. Carbon nanotubes are conductive structures with high length-to-diameter ratios, and it has been found that that these exhibit some nonlinear optical effects. It has been suggested that carbon nanotubes may be used for numerous optical purposes but none in a way that utilize ordinary radio wave antenna techniques scaled to light wavelengths.

Figure 2:
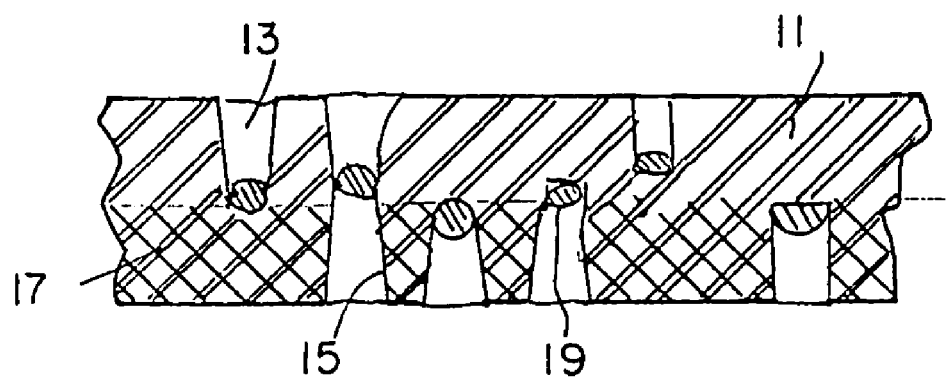
FIG. 2 is a cross-section of a foraminous substrate material structure with nanoparticles.

Referring now to FIG. 2, a foraminous substrate material structure with nanoparticles, substrate material 11 is comprised of silica, silicon or other material that may insulate or partially conduct and which may be made foraminous in a controlled, predetermined manner. Depressions 13 may extend partially into the substrate material or apertures 15 may extend through the thickness of the substrate. The foraminous substrate structure may be made by leaching the silica with the sol-gel process (not shown) which produces mesoporous silica, and may alternatively be used to produce a controlled foraminous surface in silicon, which is a semiconductor, or gallium arsenide, for example. If the substrate material 11 is of a dopable semiconducting material, doped region 17 may be produced by processing known in conventional transistor material fabrication practice. The doped region 17 may be effective to render some or all of the region on the substrate more or less polarized with respect to electrical charge or current transport across that region. The region 17 may extend into depressions 13 or apertures 15. Iron nanoparticles 19 may be produced in the substrate by the method of depositing a finely ground iron oxide dust (not shown) in the porous substrate and then by reducing the iron oxide by heating the substrate to a temperature of about 550 degrees centigrade in 180 torr of flowing $H_2N_2$ for approximately 5 hours. The remaining reduced metal leaves the residual nanoparticle 19 that may be embedded in the substrate. The substrate itself should be thin. The thinnest substrates may be in a range of 200 nanometers or less and may be produced by tapering the edge of a thin section of substrate material down to a near molecular edge by acid etching, drawing, or other ablative process. Alternatively, thin sections may be produced in thicker areas by ablative methods such as spark erosion or laser ablation, the advantage being that a stronger surrounding support structure may be formed around a very thin active area of the substrate.

It is important to point out that oxides of metals such as iron are commonly known to have semiconducting properties and therefore may form part of a semiconducting junction. The small size of these particular nanoparticles makes them suitable for junctions that are electrically short enough to operate effectively at very high frequencies, including light frequencies since they are small relative to light wavelengths. A typical red light wavelength may be around 600 nanometers, and an iron nanoparticle may be less than 100 nanometers and typically may be in the range of 10 to 30 nanometers average diameter.

Figure 3:
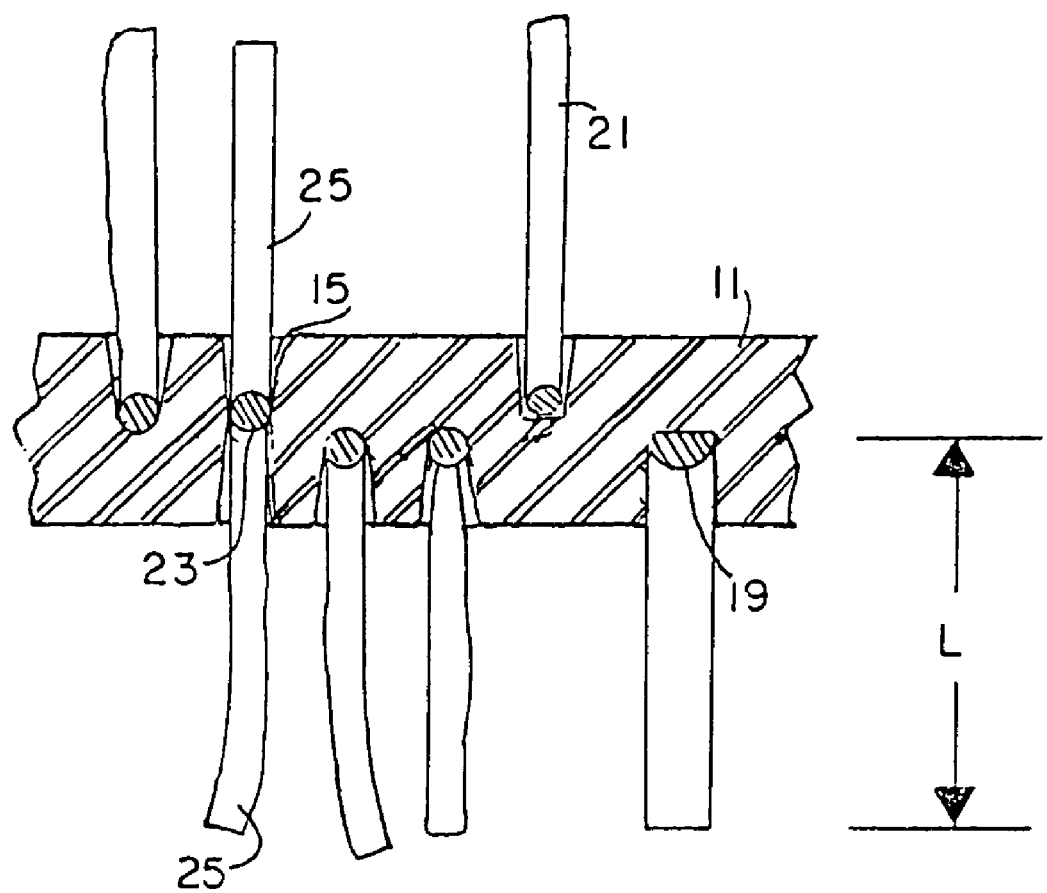
FIG. 3 is a partial cross-section of a foraminous substrate material with nanoparticles and linear elements disposed at right angles to the substrate.

Referring to FIG. 3, a prepared substrate 11 with embedded nanoparticles 19 may be supplied with acetylene-fed carbon nanotubes 21 extending from depressions 13 or apertures 11. The mechanism of nanotube generation and growth in a prepared foraminous substance appears to involve a process in which particles act like seeds for the initiation of nanotube growth, and that the orientation and direction of the initiated nanotube growth is then influenced by the orientations of the depressions and apertures, which may simply serve as guides at the early stage of growth. Other forces and influences such as a static electric field, a magnetic field, or the application of various electromagnetic fields such as radio wave energy and lightwave energy, may also influence the orientation and growth process. In particular, the application of a static electric field to the substrate and subsequent charging of the growing nanotubes may improve separation and aid in the regularity and evenness of the separation of individual strands through the mutual repulsion force resulting from an adjacent like charge. The apparatus to grow nanotubes consists of a chamber (not shown) into which acetylene is introduced and burned incompletely which creates soot. The soot is comprised of regularly shaped carbon atoms which have been observed to self assemble into the nanotube configuration.

Still referring to FIG. 3, the length L of the nanotube may be controlled by regulating the time allowed for growth. The average length of the nanotube or nanotubes may be monitored by measuring the light absorption characteristics during the growth process which change as the tube grows. Generally, as the tube lengthens it admits longer wavelengths according to a relationship known in electromagnetic theory in which the propagation time of the electric charge across a body determines its electrical length and its admittance or ability to preferentially absorb and/or radiate at a specific wavelength. For a ½ wavelength dipole arrangement each side of the substrate may have an approximately ¼ wavelength long conductor, and is most responsive to a wavefront that propagates in a direction that is perpendicular to the broad side of the conductors. Conductor lengths L that correspond to ¼ wavelength from ultraviolet, through the visible and to infrared light may have a range from about 60 nanometers to about 10000 nanometers may be accomplished using current techniques. The axial relationship of the two ¼ wavelength conductor set 25 and their more-or-less perpendicular disposition relative to the substrate make this array polarization sensitive to lightwave energy. In general, a higher current and lower voltage may be observed near the center of a resonant dipole arrangement in accordance with the conventional antenna art. It may be desirable to raise the voltage near the junction which may be accomplished either by adjusting the length of the antenna element or by placing the junction off center. It is known that ½ wavelength resonant antennas exhibit current minima and voltage maxima at the ends of the conductors, therefore, it may be desirable to approach lengths of ½ wavelength on each side of the substrate thereby producing a resonant structure about at about one full wavelength.

The thickness of the substrate and the thickness of the conductor may result in a longer charge transport pathway that tends to shorten the overall length of the dipole antenna somewhat. This shortening effect is well known in the radio art as it relates to thick antenna elements, but is less appreciated as it relates to the intersection of antenna elements since the delay times associated with radio frequency connections and intervening junctions are usually small with respect to the wavelength involved. In lightwave regimes these delays are more significant. To reduce internal charge transport or propagation of charge delay in the invention, a paired junction 23 may be constructed by growing two opposing nanotubes from one iron particle with the advantage of better electrical length control and less dependence upon substrate thickness to define the length of the structure.

It should be pointed out that the exact role and semiconductive properties of reduced metals within a substrate and their operation when connected to at least one end of a carbon nanotube has not been studied in sufficient detail, and it is possible that any discontinuity represented by any interruption of the nanotube itself, including termination, distortion etc., may be found to have inherent nonlinear properties which could additionally bene fit the efficiency of the present invention. Due to the small size of these junctions and the high frequencies involved, tunneling effects, in addition to band gap effects, may be produced at or near the junctions or physical discontinuities of the structures as generally described.

Figure 4:
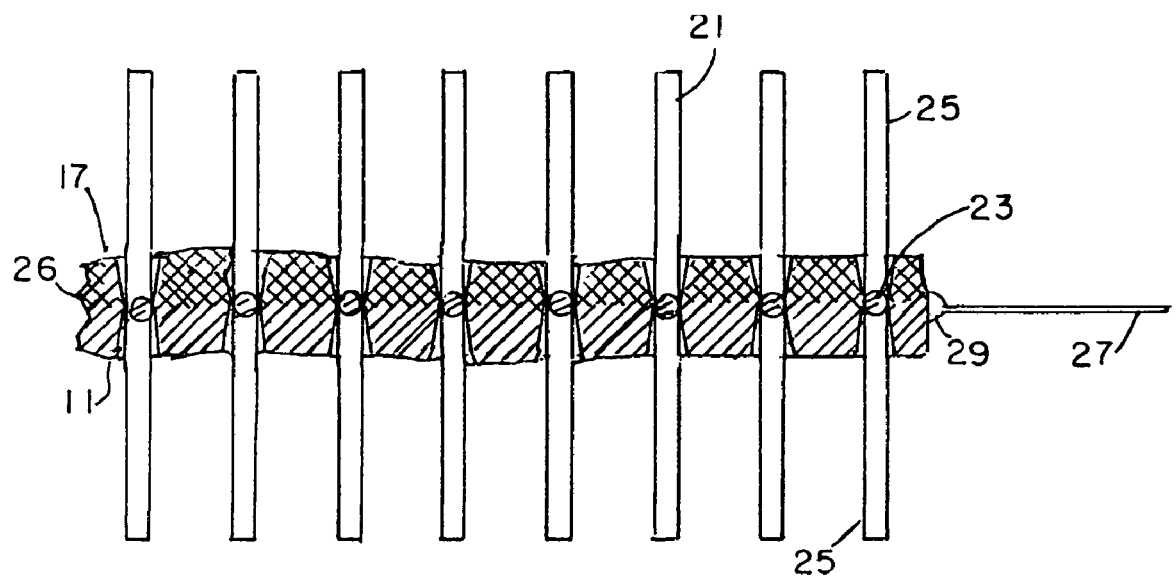
FIG. 4 is a partial cross-section of a light modifying device with arranged linear elements of approximately equal lengths joined at a substrate and a terminal attached to the substrate.

Referring now to FIG. 4, an optical antenna array 26 has paired junctions 23 and conductor sets 25 of approximately equal lengths joined at substrate 11. Electrical terminal 27 is bonded to the substrate 11 by bond 29 which may be in electrical communication with either doped or undoped regions of the substrate. Application of a current to terminal 27 is effective to bias the electrical transport properties of the assembly. Application of an alternating waveform is effective to modulate the transport properties across the optical antenna array 26 in a periodic manner which causes it to act in a way that is similar to a diode switch or mixer arrangement as commonly encountered in the electrical and radio art. Since the inherent transport properties across the optical antenna array 26 are nonlinear, mixing and superimposition of the modulating electrical waveform with the light waveform is produced. Conversely, variations in the amplitude or phase of the light waveform are effective to influence the electrical port. These may produce sum and difference signals through the various processes known as heterodyning and modulating, and may result in an amplification or increase of the total power realized.

Figure 4A:
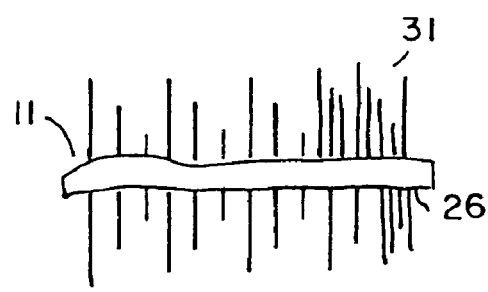
FIG. 4a is a partial cross-section of a light modifying device in which linear elements are of various lengths along the length of a substrate material.

Referring to FIG. 4a, the optical antenna array 26 is supplied with staggered conductor sets 31 disposed upon substrate 11. As in the prior art radio frequency tag 5 shown in FIG. 1a, the lengths of the antenna or conductor elements are effective to enhance reradiation at certain wavelengths of operation. Referring once again to the light modifying device assembly of FIG. 4a, two, three or more wavelengths may be selectively admitted and radiated depending upon the mix and distribution of element lengths. Best efficiency is obtained when the radiated energy is harmonically related to admitted energy. Practical devices with bandwidths broad enough to admit and radiate over a wide range of wavelengths are accommodated with this construction. To produce elements of varying lengths on the substrate, the process of particle deposition and nanotube growth may be repeated multiple times on a single substrate since the maternal $C_{60}$ can withstand considerable thermal cycling without damage.

Figure 4B:
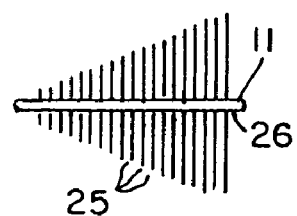
FIG. 4b is a partial cross-section of a light modifying device in which linear element lengths are tapered with respect to each other and a substrate material.

Referring to FIG. 4b, an optical antenna array 26 is patterned after a commonly known antenna type known as a log-periodic dipole array. Tapered length conductor sets 25 are effective to operate over a wide range of wavelengths, and coupling of the electromagnetic fields between adjacent elements is effective to selectively reinforce wave propagation so that a directional preference of the optical antenna array 26 is obtained. The log-periodic dipole array is merely exemplary; other antenna types include, but are not limited to, dipole, Yagi-Uda, collinear, phased array, rhombic or other structures that are known to radiate and admit electromagnetic energy in accordance with the antenna art, and conductors that are scaled and positioned with regard to the wavelengths of electromagnetic energy involved which may include transmission line structures comprised of more or less linear conductors.

Figure 5A:
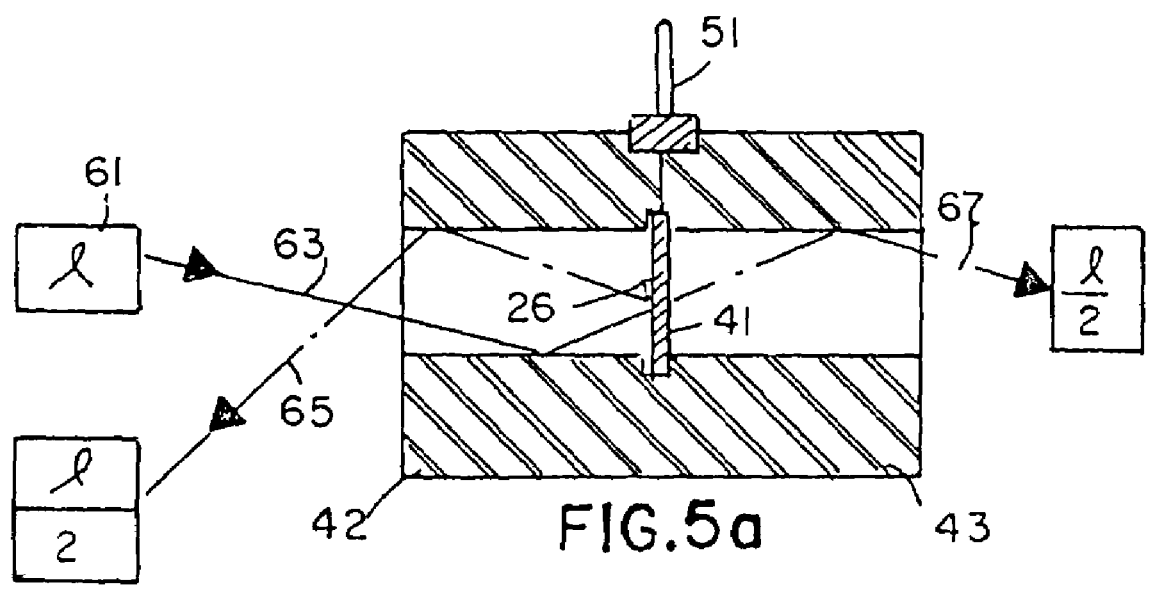
FIG. 5a is a schematic diagram of the light modifying device of FIG. 5 in which lightwave energy is admitted and transmitted after undergoing frequency conversion, mixing or amplification.
Figure 5:
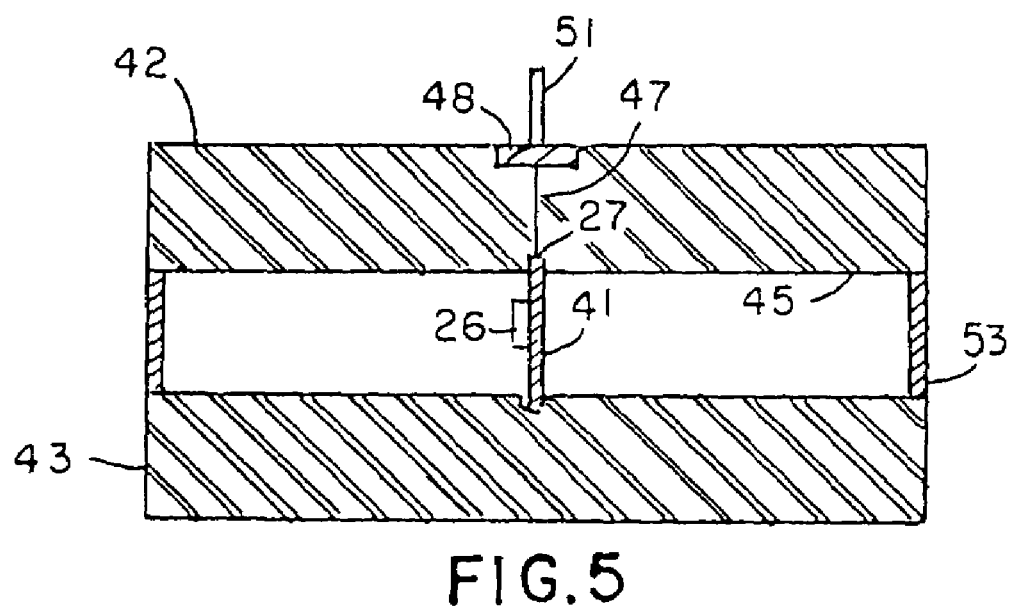
FIG. 5 is a cross-section of a light modifying device in which the substrate with linear elements are disposed with respect to an electrical terminal and two optical windows to form a 3 port system.

Referring now to FIG. 5, an optical antenna array device 42 encloses the optical antenna array 26 which is mounted in a tubular holder 43 by means of a mounting plate 41. The holder may be made from machined aluminum which may have an outside diameter of about 1 mm and an inside diameter of about 0.25 mm or less. Larger or smaller structures may be constructed within the scope of the invention. A coating of aluminum 45 is deposited in center bore of holder 43 by a vacuum metalization process. The coating acts like a mirror which helps direct light from window 53 to and from the optical antenna array 26. Electrical wire 47 is brought out through insulator 49 to terminal 51 for the purpose of attaching and electronic device such as an oscillator, a receiver, a spectrum analyzer, a pulse generator, an amplifier, a power supply or the like to electrical terminal 27.

Referring to FIG. 5a, the operation of the optical antenna array device 42 is shown in block diagram form. Light source 61 (λ) shines light bean 63 into holder 43 and onto mounting plate 41 carrying the optical antenna array 26. The glancing angle of the light beam against the inside of the holder helps avoid a condition where all the light energy wave front is entirely perpendicular to the plane of the substrate. Mounting plate 41 may alternatively be positioned diagonally in holder 43 so that light energy propagates in a direction that is generally broadside to the long axes of the carbon nanotubes 21, as shown in FIG. 4, which are aligned with a generally perpendicular orientation with respect to the substrate material 11.

Returning once again to FIG. 5*a*, light beam 63 may interact with optical antenna array 26 which may produce reflected beam 65 ($\lambda$/2) at least a portion of which contains high levels of second, third or higher order harmonic energy. Simultaneously, transmitted beam 67 ($\lambda$/2) may interact with optical antenna array 26 which generates significant harmonic energy and propagates in a direction generally opposite light beam 63. Some isolation is afforded by the light loss that occurs at the optical antenna array 26 so that a plurality of light beams of different wavelengths may be introduced simultaneously, and their products may be detected at terminal 51. Polarization and isolation may be enhanced by the use of polarizing filters (not shown) and magnetic rings (also not shown) attached to one or more ends of holder 43.

What has been described is a practical harmonic generating device that can operate over a wide range of light wavelengths utilizing an optical antenna array system that is optimized for lightwave operation. The use of an array of elements that are produced at dimensions and oriented in a repeatable manner create optimal conditions for efficient collection, conversion and radiation of electromagnetic lightwave energy. This high efficiency is due to the ordered arrangement of conductive elements optimally dimensioned for electromagnetic radiation as previously practiced in the radio and antenna art which may now be practically applied to optical wavelengths. Further, attenuation effects are minimized through the use of optical elements which may operate in free space being attached at only one end, rather than in bulk, disordered form or in a solution. The invention allows the fabrication and practical use of linear conductors as antennas with lengths that correspond to light wavelengths and therefore allows the application of radiowave antenna, transmission and radiation practices, including harmonic generation and mixing, detection and frequency multiplication, to the lightwave regime.

Variations, modifications, and other implementations of what is described herein will occur to those of ordinary skill in the art without departing from the spirit and scope of the invention as claimed. Accordingly, the invention is to be defined not by the preceding illustrative description but instead by the spirit and scope of the following claims.

I claim:

1. A method of moving a carbon nanotube which is attached by one end thereof, to a junction on a substrate, said method comprising:
    applying a charge to said carbon nanotube; and
    providing a repelling force to an adjacent structure from said carbon nanotube to which said charge has been applied.

2. The method of moving a carbon nanotube as recited in claim 1, wherein said junction comprises a nanoparticle.

3. The method of moving a carbon nanotube as recited in claim 1, wherein said junction comprises a catalyst.

4. The method of moving a carbon nanotube as recited in claim 1, wherein said junction comprises a metal.

5. The method of moving a carbon nanotube as recited in claim 1, wherein said junction is a metal oxide.

6. The method of moving a carbon nanotube as recited in claim 1, wherein said substrate comprises an array of depressions.

7. The method of moving a carbon nanotube as recited in claim 1, wherein said moving of said carbon nanotube comprises a bending of said nanotube.

8. The method of moving a carbon nanotube as recited in claim 1, wherein said adjacent structure comprises a further carbon nanotube.

9. The method of moving a carbon nanotube as recited in claim 1, including:
    arranging an electrical terminal on said substrate; and
    applying an electrical signal to said terminal.

* * * * *